June 24, 1952   P. B. LOOMIS   2,601,619
OPTICAL VIEWER FOR FILMS
Filed March 31, 1949   3 Sheets-Sheet 1
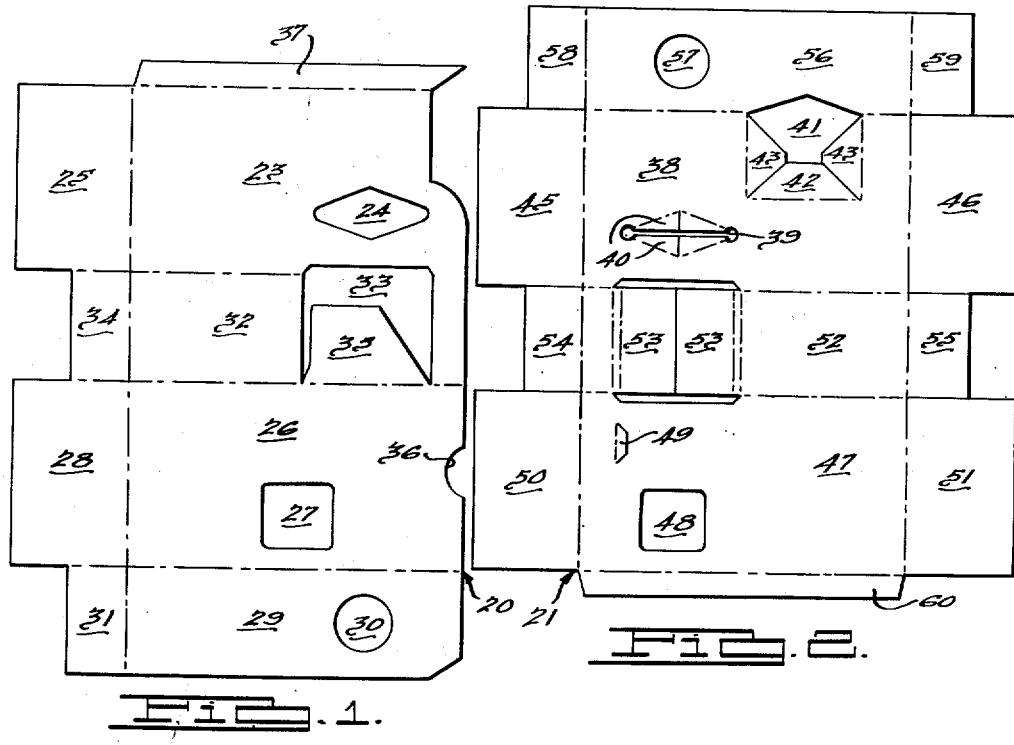
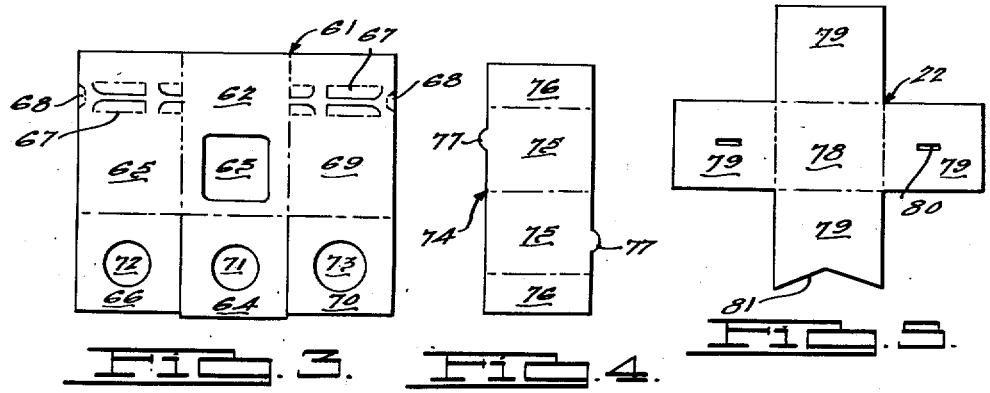
INVENTOR.
Peter B. Loomis.
BY
Harness, Dickey & Pierce
ATTORNEYS.

June 24, 1952    P. B. LOOMIS    2,601,619
OPTICAL VIEWER FOR FILMS

Filed March 31, 1949    3 Sheets-Sheet 2

INVENTOR.
Peter B. Loomis.
BY
Harness, Dickey & Pierce
ATTORNEYS.

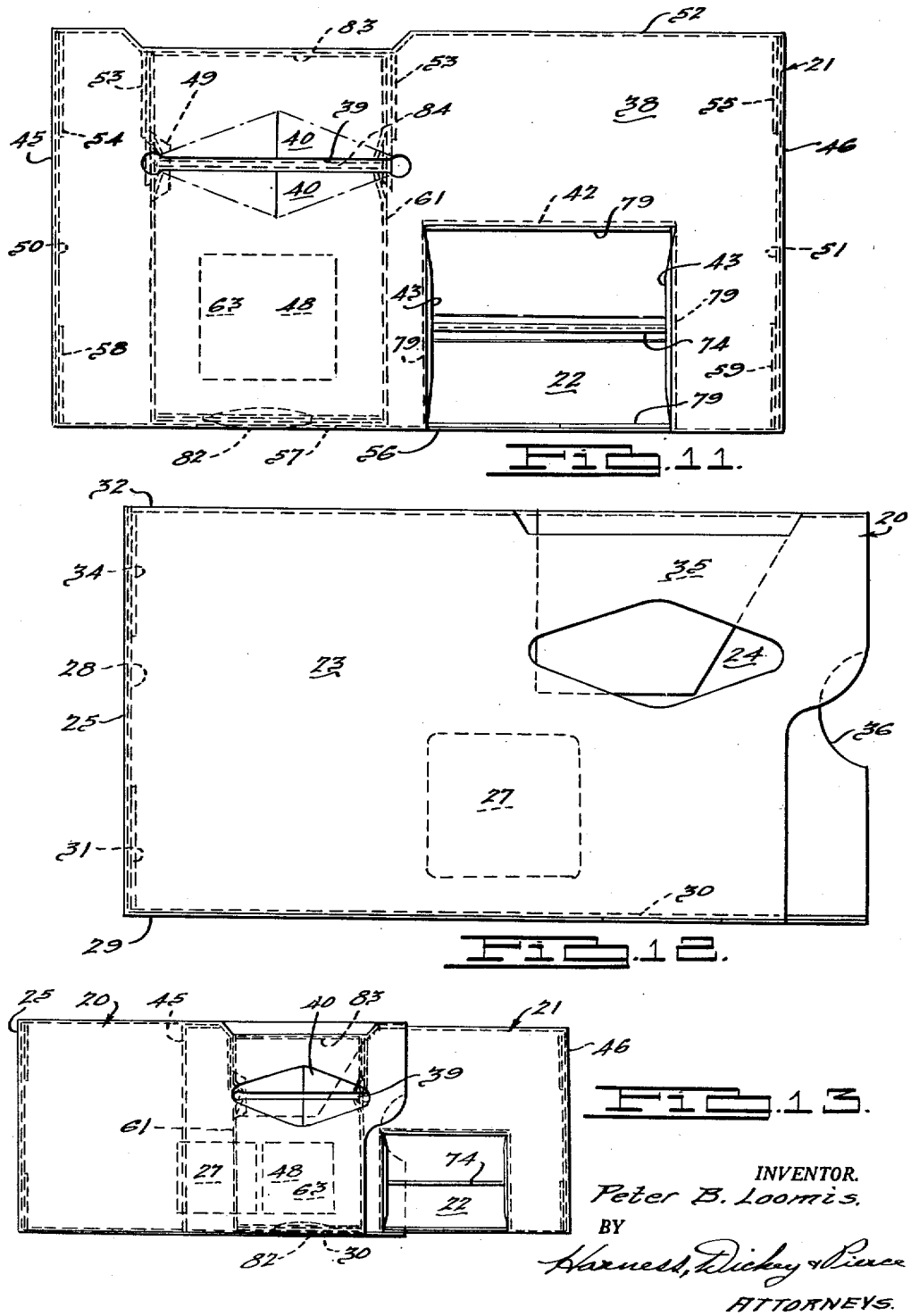

Patented June 24, 1952

2,601,619

UNITED STATES PATENT OFFICE 2,601,619

OPTICAL VIEWER FOR FILMS

Peter B. Loomis, Birmingham, Mich.

Application March 31, 1949, Serial No. 84,687

4 Claims. (Cl. 40—28)

This invention concerns a box structure which serves as a visual aid in the examination of films or slides and is particularly concerned with an optical viewer for slides or films which is convenient for easy manipulation and for easy handing around from one person to another.

The taking of photographs in color has become increasingly popular and there has developed a need for suitable apparatus in which to view the developed films. Such an apparatus should provide for magnification, for the admission of a strong but diffused light, and for the protection of the optical members from the infiltrations of dust and dirt.

One of the particular disadvantages of ordinary magnification devices which are directed toward a source of strong light is the strain which is induced in the eye which is not being used. This eye is either exposed to the direct light or it is closed. The closing of one eye invariably causes fatigue if carried on over any significant period of time.

The optical viewers of the art which have been adopted have the disadvantage of being relatively costly to construct. For example, the means used to mount the lens and the separate means used to mount the film are normally quite elaborate with respect to both their manufacture and their assembly.

It is an object of this invention to provide an apparatus adapted to provide visual aid in the examination of film, or slides.

It is an object to provide an apparatus in which films can be viewed with convenience and without fatigue to the eyes of the observer.

It is a further object to provide in such an apparatus means for magnifying the slide, means for the admission of a strong diffused light, and means for protecting the optical system and other functional parts from dust.

It is a further object of the invention to provide an optical viewer which is made from several flat pieces of cardboard or other easily foldable material where all the various supporting structures, such as the lens holder, film supports and the like, are made in a single stamping operation.

I have now found that the foregoing and related objects can be secured in a box assembly, preferably formed from a small number of stamped sheets, which includes a viewer compartment, a cover for the compartment hereinafter referred to as the inner box, and an adjustable cover for the inner box. It is preferred that the cover for the inner box be in the form of a box which slides over the inner box. Access to the viewer compartment is provided through limited openings and cooperating flaps.

Other objects and features of novelty of the invention will be specifically pointed out or will become apparent when referring, for a better understanding of the invention, to the following description taken in conjunction with the accompanying drawings, wherein:

Figure 1 is a view of an outer box of a box assembly of the invention as it appears when completely unfolded and lying flat.

Fig. 2 is a view of an inner box of a box assembly as it appears when completely unfolded and lying flat.

Fig. 3 is a view of the viewer compartment in its unfolded or flat position.

Fig. 4 is a view of a storage bin separator in its unfolded position.

Fig. 5 is a view of a film storage bin in its unfolded position.

Fig. 11 is a top view of the inner box of Fig. 2 in its folded form and including the bin and optical system.

Fig. 12 is a top view of the outer box of Fig. 1 in its folded form.

Fig. 13 is a view of a complete viewer box assembly embodying features of the present invention.

Figure 6:
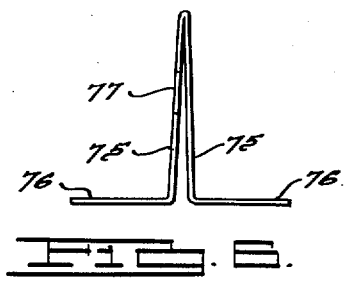
Fig. 6 is an end view of the bin separator of Fig. 4 in its folded or functional position.

Referring more particularly to the drawings, the box assembly or optical film viewer consists generally of an outer box 20 and an inner box 21 wherein the inner box is adapted to slide to and fro to assume various desired positions within the outer box and wherein the inner box has incorporated into its structure an optical system and a film storage bin 22.

The outer box 20 as shown particularly in Fig. 1 and Fig. 12 consists of a top wall 23 containing a substantially diamond shaped aperture 24 and an end flap 25, a bottom wall 26 containing a substantially square aperture 27 and an end flap 28, a side wall 29 containing a substantially circular aperture 30 and an end flap 31, and a second side wall 32 containing a substantially square light inlet aperture 33 and an end flap 34. A pressure flap 35 is foldable along the edge of the bottom wall 26 and the edge of the light inlet aperture 33. An indentation 36 is provided in the bottom wall and is adapted to provide clearance for grasping the inner box when the latter is completely within the outer box. A flap 37 attached to the top wall 23 is adapted to be secured to the side wall 29 when the box is folded.

The inner box 21, as shown particularly in Fig. 2 and Fig. 11, is provided with a top wall 38 containing a film inlet slot 39, retractable flaps 40 extending into said slot 39, a bin inlet aperture 41, a bin pressure flap 42, separator pressure flaps 43, and end flaps 45 and 46. A bottom wall 47 is provided with a substantially square aperture 48, a stop tab 49, and the end flaps 50 and 51. A side wall 52 of the inner box 21 is provided with door-like pressure flaps 53 which provide a substantially square aperture (not shown). The side wall 52 also contains the end flaps 54 and 55. A second end wall 56 contains a substantially circular aperture 57 and the end flaps 58 and 59. A flap 60 attached to the bottom wall 47 is adapted to be secured to the side wall 56 when the box is folded.

The viewer compartment 61, as shown in Fig. 3, consists of a bottom wall 62 containing a substantially square aperture 63 and an end flap 64; a side wall 65 containing an end flap 66, slide support tabs 67 and a guide tab 68; and a second side wall 69 containing an end flap 70, slide support tabs 67 and guide tab 68. The end flaps 64, 66, and 70 are each provided with a substantially circular aperture 71, 72, 73 respectively, one of said apertures (73, as shown) being larger in diameter than the other two.

The bin separator 74, as shown particularly in Fig. 4 and Fig. 6, consists of two web portions 75, each having an end flap 76 adapted to serve as a base for said separator. Tabs 77 are attached to the web portions 75.

Figure 7:
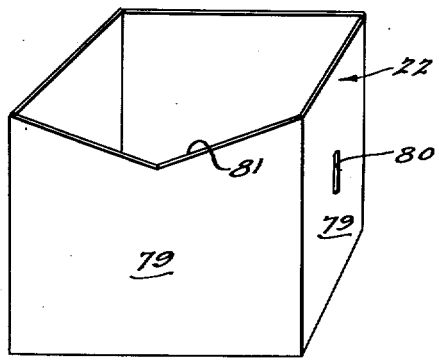
Fig. 7 is a perspective view of the bin of Fig. 5 when folded.

A film storage bin 22, as shown particularly in Fig. 5 and Fig. 7, comprises a bottom wall 78 and side walls 79. A pair of oppositely disposed side walls 79 are provided with slots 80 for receiving the tabs 77 of the separator 74. As shown, an indentation 81 is provided in one side of the bin to provide ready accessibility to the bin.

Figure 9:
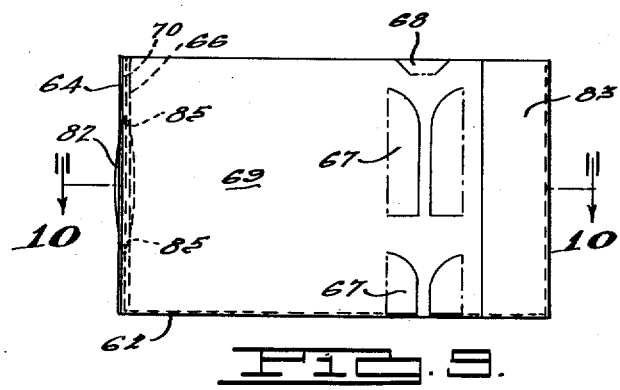
Fig. 9 is a side view of the viewer compartment of Fig. 3 in its folded or functional form and including a lens and a light diffusing translucent sheet.
Figure 10:
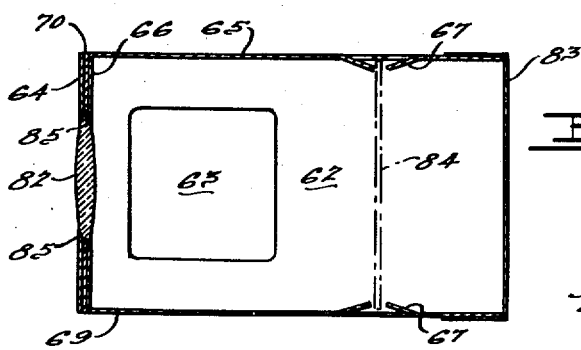
Fig. 10 is a sectional view of Fig. 9 taken along the line 10—10.

Fig. 9 and Fig. 10 illustrate the viewer compartment structure of Fig. 3 in the folded or functional form. The sides 65 and 69 have been folded upwardly along the broken lines to lie perpendicular to the bottom wall 62 and the flaps 64, 66 and 70 have been folded in a manner such that the inner flap 70 containing the largest hole 73 lies between the two outer flaps 64 and 66. In this manner there is provided a small recess 85 between the two outer flaps in which to set a magnifying lens 82. A translucent sheet 83 is used to cover the open end of the viewer compartment 61 and is adapted to diffuse the light entering the compartment.

The film 84 to be viewed, shown in broken lines, is positioned between the oppositely disposed support tabs 67. The guide tabs 68 are bent slightly outwardly to provide a guide for the film 84 as it is inserted into the structure.

Fig. 11 illustrates the folded or functional form of the inner box 21 shown in Fig. 2 and includes the viewer compartment 61 and the slide storage bin 22 in position. The top wall 38 and side walls 52 and 56 have been folded along the broken lines to position the top wall 38 over the bottom wall 47 and the flap 60 attached to the bottom wall 47 has been secured to the side wall 56 by gluing, taping and the like. The end flaps 45, 50, 54, and 58 and the end flaps 46, 51, 55 and 59 are then folded inwardly and secured together to close the respective ends of the box.

Figure 8:
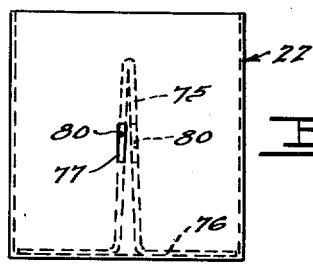
Fig. 8 is a side view of the bin of Fig. 7 having positioned therein the bin separator of Fig. 6.

The slide storage bin 22 containing the separator 74 is inserted into the folded inner box 21 through the aperture 41 in a manner such that the bin pressure flap 42 lies outside the bin and its resilient effect tends to force the bin against the side wall 56 and thus hold it snugly in position. The separator pressure flaps 43 are bent downwardly in a manner such that each lies between a side wall 79 of the bin and an edge of the separator and their inwardly directed resilient force tends to hold the separator firmly in position. The separator may also be secured by gluing the under side of the base portion 76 to the bottom of the bin 78. Further, and as shown in Fig. 8, tabs 77 attached to the separator 74 may be inserted in the slot 80 of the bin 22 for additional stability.

The viewer compartment 61 is inserted into the inner box 21 through an aperture created by folding inwardly the two door like flaps 53 in the side wall 52. The flaps 53 lie outside and against the viewer compartment 61 and their resilient force exerted against the compartment tends to secure it snugly in position. When the viewer compartment is in position the circular aperture 57 in the side wall 56 of the inner box lies concentric to the lens 82 in the viewer compartment. Similarly the square aperture 63 in the bottom 62 of the viewer compartment 61 is superimposed on the square aperture 48 in the bottom 47 of the inner box 21. The square apertures 48 and 63 are provided in order that the inner surface of the lens 82 may be reached from the outside conveniently for cleaning.

Fig. 12 illustrates the folded or the functional form of the outer box 20 which is shown lying flat in Fig. 1. The top wall 23 has been folded upwardly to lie over the bottom wall 26 and the side wall 29 has been bent upwardly and has been glued or otherwise secured to the flap attached to the top wall 23. The end flaps 25, 28, 31 and 34 are folded inwardly to close one end of the outer box. The other end of the outer box is left open to receive the inner box in slideable engagement. The pressure flap 35 is bent against the bottom wall 26 in order that its resilient force will be directed upwardly against the inner box 21 when the latter is inserted in the outer box. The use of the pressure flap 35 results in a snug fit between the inner and outer boxes and avoids undesired slippage between them.

Fig. 13 illustrates the position of the final box assembly when the inner box 21 is approximately half inserted in the outer box 20. This is the position of the boxes at the time the film 84 is viewed. In this position, the viewing position, the substantially diamond shaped aperture 24 in the top wall of the outer box is superimposed on the slot receiving aperture 39 in the inner box such that a film may be passed through these two apertures and between the oppositely disposed plurality of flexible or retractable flaps 40 in the viewer compartment 61. The flexible flaps are positioned around the film receiving slot in order that they may be retracted by pressure from the fingers of the observer and in order that a film completely within the inner box may be conveniently grasped by the fingers.

In the viewing position also, the circular aperture 30 in the side wall of the outer box is concentric with the circular aperture 57 of the inner box, the circular aperture (formed from 71, 72 and 73) of the viewer compartment, and with the lens 82 of the viewer compartment. In this manner there is provided an unobstructed view of the film through the lens. Similarly in this position, the film storage bin 22 is uncovered and film, or slides, removed or replaced in the bin conveniently.

When the use of the box assembly is no longer desired the inner box may be pushed completely into the outer box to enclose completely the inner box. In this manner, the viewer compartment including the lens 82, the film receiving slot 39 of the top wall of the inner box, the bin 22, and the translucent sheet 83 all are covered by a portion of the walls of the outer box.

When the box is again required for use the inner box is pulled outwardly to the point where the stop tab 49 which is bent inwardly engages the pressure flap 35 of the outer box, as shown in Fig. 13. This latter engagement occurs at the position where the two boxes are aligned for unobstructed vision of the film.

In the open position the substantially square aperture 48 and 63 in the bottom of the inner box lies to the right, as shown, of the substantially square aperture 27 on the bottom of the outer box. In the closed position of the assembly the square aperture 48 and 63 of the inner box lies to the left of the square aperture 27 of the outer box. There is, therefore, an intermediate position between the closed and open position where the two square apertures are superimposed and the boxes may be placed in this latter position when it is desired to reach into the box for the purpose of cleaning the interior face of the lens.

It is preferred that the translucent sheet which forms the rear wall of the viewer compartment be recessed in the inner box, that is spaced from the rear wall of the inner box. This provision minimizes the danger of the observer grasping the relatively delicate structure of the translucent sheet as he handles the box assembly.

An important feature of the viewer box assembly lies in the fact that the viewer compartment is maintained more or less dust free. When the box is in its completely closed position all openings to the viewer compartment are closed. Even when the box is open there is a minimum of open area leading to the viewer compartment. In the latter case the lens is exposed only through the circular aperture in the front wall of the outer box and the slide is exposed only through the relatively narrow slide receiving slot in the top of the inner box.

A second important feature lies in the fact that there is a substantial surface area to both the right and left of the lens when the slide is being observed. Thus, whether the observer is using his right or left eye the other eye is shielded from the light. This provides comfort to the eyes especially during extended use of the box assembly.

A third important advantage of the invention lies in the provision for the bin and separator. A selected number of slides of particular interest may be kept with the apparatus by storing them in the bin. Further, during use, the slides which have been observed may be kept on one side of the separator and the slides which have not yet been observed may be kept on the other side of the separator.

The retractable flaps in the top wall of the inner box have the advantage of covering the area immediately above a positioned slide and yet retract sufficiently to enable a grasping of the slide for purposes of withdrawing the latter. In this manner also it is unnecessary that any portion of the slide project beyond the top wall of the box at the time the slide is being viewed.

Although the openings which house the lens as well as the other openings through which the lens and interior of the viewer compartment are observed are shown in the drawings as circular, it will be apparent that they may assume any suitable shape. For example, colored films are normally somewhat wider than they are high and therefore can be best observed through an oval shaped opening in which the major diameter of the oval is horizontal to correspond with the longer dimension of the film.

It will be apparent that various structures may be substituted for those shown without departing from the invention.

In any of its modifications the assembly may be made by the folding of a few stamped sheets of cardboard, plastic or the like, thereby introducing economies in the materials of construction and in the time of assembly. In particular, the lens mounting, the film positioning tabs, the storage bin, and the means for blocking off direct light from the eyes may be taken care of in the stamping and folding operations.

I claim:

1. A box assembly adapted to provide visual aid in the examination of a film placed therein, said box having in one wall a film receiving slot adapted to permit passage of a film into said box and having in two other opposed walls aligned openings to provide an unobstructed path for light through said box, and a plurality of flexible flaps in said first wall and surrounding said slot and adapted to be depressed inwardly of the plane of the wall in order that a film inside the box may be grasped through said slot from the outside.

2. A film-viewer box assembly comprising an outer box, an inner box, a viewer compartment, a lens, a film storage bin and a bin separator; said outer box comprising a top wall provided with a film receiving aperture sufficiently large for a film to pass therethrough and to receive a sufficient portion of an observer's fingers to enable the observer to grasp said film through said aperture, a bottom wall provided with an aperture adapted to permit the insertion therethrough of cleaning tissue and the like by means of the fingers and being provided with a flap adapted to exert a pressure upwardly against said inner box, a front wall provided with an opening adapted to permit the observation of objects within said box assembly, a rear wall provided with an opening adapted to admit light to said viewer compartment; said inner box being slideably engageable within said outer box and comprising a top wall provided with an opening adapted to receive said bin and having, protruding from the sides of said opening, a pressure flap adapted to fold downwardly into a position behind said bin and force said bin toward the front wall of said inner box and said opening having oppositely disposed pressure flaps each adapted to fold downwardly into a position between an inside wall of said bin and an edge of said separator, said top side also including a film receiving slot, said slot having protruding therein a plurality of retractable flaps adapted to be forced downwardly as the slot opening is increased by the fingers used to grasp the film, a bottom wall provided with a stop tab and an opening adapted to permit the insertion therethrough of cleaning tissue and the like by means of the fingers, a front wall provided with an opening adapted to permit the observation of objects within said inner box, a rear wall provided with an opening adapted to receive said viewer compartment and provided with two door-like pressure flaps which are adapted to be bent inwardly into said inner box when the viewer compartment is placed in position and are further adapted to press against oppositely disposed walls of said viewer compartment; said film storage bin comprising an open top box which is positioned within the body of said inner box; said bin separator being adapted to divide the bin space into compartments and said separator being provided with protruding tabs which are adapted to be inserted in corresponding slots in said storage bin; said viewer compartment being a box-like structure and comprising a bottom wall provided with an opening adapted to permit the insertion therethrough of cleaning tissue and the like by means of the fingers, oppositely disposed side walls each provided with outwardly bent tabs adapted to guide a film into position as said film is being inserted into position for viewing and said side walls each being provided with oppositely disposed pairs of inwardly projecting tabs adapted to hold the inserted film in a vertical attitude, a translucent sheet as the rear wall of said viewer compartment and adapted to diffuse the light entering said viewer compartment, a front side comprising three flaps folded to lie superimposed one on the other and each flap being provided with an opening adapted to permit the observation of objects within said viewer compartment and one of said flaps which lies betwen the two outer flaps having an opening slightly larger than the opening in said outer flaps to form a substantially annular recess between said outer flaps; and said lens being adapted to be positioned in said recess.

3. The combination of film-viewer box assembly units which comprise a single sheet foldable to form an outer box, a single sheet foldable to form an inner box, a single sheet foldable to form a viewer compartment, a single sheet foldable to form a film storage bin, a single sheet foldable to form a bin separator, and a lens; said outer box when folded comprising a top wall provided with a film receiving aperture sufficiently large for a film to pass therethrough and to receive a sufficient portion of an observer's fingers to enable the observer to grasp said film through said aperture, a bottom wall provided with an aperture adapted to permit the insertion therethrough of cleaning tissue and the like by means of the fingers and being provided with a flap adapted to exert a pressure upwardly against said inner box, a front wall provided with an opening adapted to permit the observation of objects within said box assembly, a rear wall provided with an opening adapted to admit light to said viewer compartment; said inner box when folded being slideably engageable within said outer box and comprising a top wall provided with an opening adapted to receive said bin and having, protruding from the sides of said opening, a pressure flap adapted to fold downwardly into a position behind said bin and force said bin toward the front wall of said inner box and said opening having oppositely disposed pressure flaps each adapted to fold downwardly into a position between an inside wall of said bin and an edge of said separator, said top side also including a film receiving slot having protruding therein a plurality of retractable flaps adapted to be forced downwardly as the slot opening is increased by the fingers used to grasp the film, a bottom wall provided with a stop tab and an opening adapted to permit the insertion therethrough of cleaning tissue and the like by means of the fingers, a front wall provided with an opening adapted to permit the observation of objects within said inner box, a rear wall provided with an opening adapted to receive said viewer compartment and provided with two door-like pressure flaps which are adapted to be bent inwardly into said inner box when the folded viewer compartment is placed in position and are further adapted to press against oppositely disposed walls of said viewer compartment; said film storage bin when folded comprising an open top box which is positioned within the body of said inner box; said bin separator when folded being adapted to divide the bin space into compartments and said separator being provided with protruding tabs which are adapted to be inserted in corresponding slots in said storage bin; said viewer compartment when folded being a box like structure and comprising a bottom wall provided with an opening adapted to permit the insertion therethrough of cleaning tissue and the like by means of the fingers, oppositely disposed side walls each provided with outwardly bent tabs adapted to guide a film into position as said film is being inserted into position for viewing and said side walls each being provided with oppositely disposed pairs of inwardly projecting tabs adapted to hold the inserted film in a vertical attitude, a translucent sheet as the rear wall of said viewer compartment and adapted to diffuse the light entering said viewer compartment, a front side comprising three flaps folded to lie superimposed one on the other and each flap being provided with an opening adapted to permit the observation of objects within said viewer compartment and one of said flaps which lies between the two outer flaps having an opening slightly larger than the opening in said outer flaps to form a substantially annular recess between said outer flaps; said lens being adapted to be positioned in said recess; said viewer box assembly having a closed position in which the openings in said inner box are covered by portions of said outer box; said viewer box assembly having an open position in which said stop tab engages an edge of the pressure flap on the bottom side of said outer box in a manner to prevent complete disengagement of the inner and outer boxes, in which the top of said storage bin is uncovered, in which the film receiving slot of the top wall of said inner box and the film receiving aperture in the top wall of said outer box are in alignment for passage of a film therethrough, and in which the opening in the front walls of the outer box, the opening in the front wall of the inner box, the lens, the film position, the translucent sheet and the opening in the rear side of said outer box are in alignment for the passage of light and the viewing of a positioned film; and said viewer box assembly having an intermediate position in which the aperture in the bottom of said outer box, the aperture in the bottom of said inner box, and the aperture in the bottom of said viewer compartment are in alignment to permit the reaching of the inside surface of said lens with cleaning tissue and the like.

4. In a box assembly adapted to provide visual aid in the examination of a film placed therein, the combination of a cover provided with openings, an inner box slidably engaged within said cover, a stop tab on one of said boxes, and optical elements mounted in said box, said inner box being provided with openings to permit passage of light through said optical elements and to permit the unobstructed view of said film, and said inner box being slidable from the position where the openings in said inner box are in alignment with the openings in said cover to a position where the openings of said inner box are disposed opposite to solid portions of said cover, and wherein there is a position of said inner and outer boxes in which said stop tab on one of said boxes engages an element on the other of said boxes to prevent the complete disengagement of said boxes.

PETER B. LOOMIS.

REFERENCES CITED

The following references are of record in the file of this patent:

UNITED STATES PATENTS

| Number | Name | Date |
| --- | --- | --- |
| 1,752,952 | Jelinek | Apr. 1, 1930 |
| 1,989,454 | Koster | Jan. 29, 1935 |
| 2,071,120 | Harlow | Feb. 16, 1937 |
| 2,071,121 | Harlow | Feb. 16, 1937 |
| 2,190,646 | Branson | Feb. 20, 1940 |
| 2,368,480 | McClure | Jan. 30, 1945 |
| 2,543,240 | Hutchinson | Feb. 27, 1951 |

FOREIGN PATENTS

| Number | Country | Date |
| --- | --- | --- |
| 324,455 | France | Apr. 1, 1903 |